(12) United States Patent
Kresta et al.

(10) Patent No.: US 7,393,879 B1
(45) Date of Patent: Jul. 1, 2008

(54) HIGH RESILIENT SILICONE FOAM AND PROCESS FOR PREPARING SAME

(75) Inventors: Jiri E. Kresta, Warren, MI (US); David Munoz Rojas, Barcelona (ES); Ramon Moliner, Barcelona (ES); Chandrasiri Jayakody, Greensburg, PA (US); Dan Myers, Scottdale, PA (US)

(73) Assignee: Chestnut Ridge Foam, Inc., Latrobe, PA (US)

( * ) Notice: Subject to any disclaimer, the term of this patent is extended or adjusted under 35 U.S.C. 154(b) by 1061 days.

(21) Appl. No.: 10/164,480

(22) Filed: Jun. 6, 2002

(51) Int. Cl.
*C08G 18/28* (2006.01)

(52) U.S. Cl. .......................... 521/110; 521/99; 521/106; 521/111; 521/112; 521/117; 521/119; 521/128; 521/129; 521/130; 521/137; 521/159; 521/170; 521/174

(58) Field of Classification Search .................. 521/99, 521/106, 110, 111, 112, 117, 119, 128, 129, 521/130, 137, 159, 170, 174
See application file for complete search history.

(56) References Cited

U.S. PATENT DOCUMENTS

| | | | |
|---|---|---|---|
| 3,574,644 A | 4/1971 | Olstowski | |
| 4,031,042 A | 6/1977 | Prokai et al. | |
| 4,033,912 A | 7/1977 | Kleimann et al. | |
| 4,110,271 A | 8/1978 | Kanner et al. | |
| 4,162,353 A | 7/1979 | Papa et al. | |
| 4,269,946 A | 5/1981 | Sullivan | |
| 4,276,385 A | 6/1981 | Tenhagen | |
| 4,304,872 A | 12/1981 | Tenhagen | |
| 4,350,777 A * | 9/1982 | Henrichs et al. | 521/110 |
| 4,698,369 A | 10/1987 | Bell | |
| 4,923,755 A * | 5/1990 | Witucki | 428/447 |
| 4,977,194 A | 12/1990 | Haas et al. | |
| 4,997,858 A | 3/1991 | Jourquin et al. | |
| 5,017,623 A | 5/1991 | Haas et al. | |
| 5,023,280 A | 6/1991 | Haas | |
| 5,120,771 A | 6/1992 | Walmsley | |
| 5,182,313 A | 1/1993 | Carson | |
| 5,456,586 A | 10/1995 | Carson | |
| 5,849,850 A | 12/1998 | Bleys et al. | |
| 5,877,227 A | 3/1999 | Murty | |
| 5,985,948 A | 11/1999 | Burkhart et al. | |
| 6,384,097 B1 * | 5/2002 | Tokumoto et al. | 521/155 |
| 6,506,810 B2 | 1/2003 | Borgogelli et al. | |
| 6,617,365 B2 * | 9/2003 | Burkhart et al. | 521/112 |
| 2001/0004646 A1 | 6/2001 | Burkhart et al. | |

FOREIGN PATENT DOCUMENTS

GB 2168706 B 10/1987

OTHER PUBLICATIONS

Ramazan Benrashid and Gordon L. Nelson, "Flammability Improvement of Polyurethanes by Incorporation of Silicone Moiety into the Structure of Block Copolymer"in Fire and Polymers II, Materials and Tests for Hazzard Prevention, ACS Symposium Series 5999 Jan. 1995, 217-235.

Chandrasiri Jayakody, Gordon L. Nelson, Usman Sorathia, and Stephen Lewandowski, "A Cone Calorimetric Study of Flame Retardant Elastomeric Polyurethanes Modified With Siloxanes and Commercial Flame Retradant Additives" in Journal of Fire Sciences, Sep. 1998, vol. 16 pp. 351-382.

Gordon L. Nelson, Chandasiri Jayakody, andUsman Sorathia, "Silicone Modified Polyurethanes", The Eighth Annual BCC Conference on Flame Retardancy:Recent Advances in Flame Retardancy of Polymeric Materials, Stamford Connecticut, Jun. 2-4, 1997.

* cited by examiner

*Primary Examiner*—John Cooney
(74) *Attorney, Agent, or Firm*—Beck & Thomas, P.C.

(57) ABSTRACT

A method for producing a novel silicone foam by reaction of a polyisocyanate with a silicone oligomer having a plurality of functional end groups with active hydrogens, optionally in the presence of fire-retardants, under foam forming conditions which creates a new silicone foam for use in items such as residential upholstered furniture industry, seat cushions and bedding etc., and specifically for use in applications that require, high resilience and fire-retardant properties such as aircraft and surface transportation seat cushioning, military and shipboard mattresses etc.

2 Claims, No Drawings

HIGH RESILIENT SILICONE FOAM AND PROCESS FOR PREPARING SAME

TECHNICAL FIELD

This invention relates to a novel flexible silicone foam and method for producing. The foam has a higher degree of resiliency than polyurethane foam. A preferred form of the foam includes fire-retardant additives.

BACKGROUND OF THE INVENTION

Flexible polyurethane foam is used for bedding and upholstered furniture due to its durability, lack of odor, non-allergenic properties, ease of cleaning, and resistance to dry-cleaning solvents, oils, and perspiration. However, ordinary flexible polyurethane foam can readily ignite because of its open cell structure, which allows the oxygen required for combustion to penetrate below the surface of the foam. Once ignited, flexible polyurethane foam tends to burn vigorously because of its very large surface area per unit weight. These risks have lead to the implementation of safety standards for industries that use polyurethane foam.

In order to meet safety standards, considerable efforts have been made to provide polyurethane foams with satisfactory flame retardancy. Most flexible polyurethane foams are produced by a condensation reaction between a polyether polyol and an isocyanate in the presence of foam forming agents. When these compounds are mixed together, liberated carbon dioxide gas acts as the blowing gas to make the material into foam. One approach to produce foams with satisfactory flame retardancy has been to add reactive or non-reactive flame-retardant as a part of the foam producing process. Phosphorus and/or halogenated compounds, borates, aluminum trihydrate, melamine, expandable graphite, and many other flame-retardants have been used in the foam making process. Another approach to make flame retardant foam is to post-treat the foam with flame-retardants after the foam has been produced.

Silicone foam is produced by a condensation reaction between a siloxane polymer containing silanol (Si—OH) groups and crosslinkers containing silane (Si—H) groups in the presence of a catalyst. When these compounds are mixed and reacted together, the formation of siloxane linkages (Si—O—Si) occurs, liberating hydrogen gas, which acts as the blowing agent to make the material into foam. Because of its high silicone content, silicone foam is typically less flammable than flexible polyurethane foam.

The most widely used silicones are based on polydimethylsiloxanes (PDMS). Tyagi, Yilgor, McGrath and Wilkes, *Polymer*, 1984, 25, 1807 reported that the characteristics of these siloxanes such as very low intermolecular forces, ease of rotation, and relatively long and fairly strong Si—O bond enable these polymers to exhibit flexibility, thermal stability, and properties which are fairly constant over a wide range of temperature. Silicone polymers in general are also known to have unique and useful properties such as low surface energy, low glass transition temperature, and high gas permeability. Robb and Ann, *Acad. Sci.* 1968, 146, 119 reported that silicone polymer is 10 times more permeable to oxygen than natural rubber and low-density polyethylene and 100 times greater than butyl rubber and nylon. Silicone polymers, including polydimethylsiloxane when not crosslinked, are widely used in the fields of cosmetics, food processing and various medical applications.

Siloxane-modified polyurethanes have a wide range of applications since their properties can be tailored by variations of their components. Siloxane-modification of polyurethanes has shown microphase segregation producing a silicone-rich soft segment in polyurethane elastomers. According to Couchman (*Macromolecules*, 1978, 11, 1156) and Camberlin, and Pascault (*J. Polym. Sci., Polym. Phys. Edn.*, 1984, 22, 1835), one of the reasons for this phase separation is the incompatibility of the soft segment (solubility parameter, $\delta=7.46$ cal$^{1/2}$ cm$^{-3/2}$ mol$^{-1}$) with polar hard segment ($\delta=13.2$). This unique rearrangement process depends on various factors such as polydimethylsiloxane length, siloxane content and the nature of the contacting surface. Tezuka, Kazama and Imal, *J. Chem. Soc. Faraday Trans.*, 1991, 87(1), 147 reported that the top surface of a block copolymer can be completely covered with the polydimethylsiloxane in the dry state and the thickness of the top layer ranged from 20-100 Å° depending on the siloxane block length and siloxane content. When the contacting surface changed from dry to aqueous, a surface rearrangement occurred producing a polyurethane-like surface. The structure and the orientation behavior of these polymers were studied by means of infrared dichroism, small angle light scattering, and differential scanning calorimetry and it was found that the incorporation of siloxane moiety in the main chain reduced the crystallization capability of the soft segments. Scanning electron microscopy/energy dispersive spectroscopy (SEM/EDS), ESCA, and FT-IR studies of a large number of silicone modified polyurethane elastomers revealed that these block co-polymers contained a silicone rich surface. Nelson, Jayakody, and Sorathia "Silicone Modified Polyurethanes", Proceedings, *The 8$^{th}$ Annual BCC Conference on Flame Retardancy*, Stamford, Conn. (1997) reported utilizing difunctional polydimethylsiloxanes both silanol terminated (Si—OH) and aminoalkyl terminated, to increase fire-retardancy of elastomeric polyurethanes. Cone calorimetric data showed polyurethane elastomers prepared using aminopropyl dimethyl terminated PDMS gives lower peak heat release rates than silanol terminated PDMS. They have identified some formulations with aminopropyl dimethyl terminated PDMS which gave peak heat release rates as low as 300 kW/m$^2$ compared to polytetramethylene ether glycol modified polyurethane elastomers (2577 kW/m$^2$) at 25 kW/m$^2$ exposure. Jayakody, Nelson, Sorathia and Lewandowski "A Cone Calorimetric Study of Flame Retardant Elastomeric Polyurethanes Modified with Siloxanes and Commercial Flame Retardant Additives", *J. Fire Sci.* Vol. 16, 1998, 351-382 showed that the replacement of polytetramethylene ether glycol from MDI based polyurethane elastomers with isobutylmethylamine terminated polydimethylsiloxanes showed a 89% reduction of peak heat release rate (261 kW/m$^2$) compared to the polytetramethylene ether glycol based system (2435 kW/m$^2$) at 25 kW/m$^2$ exposure.

The above discussion shows that the incorporation of siloxane block into the backbone of polyurethane elastomers yields a significant improvement on the flame retardancy of the polymers. A practical flexible foam including a siloxane moiety would be desirable in the art. The primary object of this invention, therefore, is to provide a new opened cell flexible silicone foam.

SUMMARY OF THE INVENTION

This invention provides a new, high resilience silicone foam and a process for producing this silicone foam by reacting a polyisocyanate with a silicone oligomer having a plurality of functional end groups with active hydrogens, and, optionally a crosslinker under foam forming conditions. Foam forming conditions include the presence of blowing agents such as water, surfactants such as silicone surfactants and catalysts such as tin and amine catalysts. Additionally, an auxiliary blowing agent can be included. The silicone oligomer having a plurality of functional end groups with active hydrogen atoms can be a polydimethylsiloxane having a molecular weight from 200 to 30,000 with hydroxyalkyl or aminoalkyl reactive end groups. When the silicone oligomer having a plurality of functional end groups with active hydrogens is difunctional it can have an optimal molecular weight in the range of 1000 to 6000. If the silicone oligomer having a plurality of functional end groups with active hydrogens is tri or polyfunctional it may have an optimal molecular weight in the range of 2000 to 8000.

When the silicone oligomer having a plurality of functional end groups with active hydrogen atoms has a functionality of 2, a crosslinker is included. The crosslinker can be glycerol, diethanolamine, triethanolamine, trimethylolpropane, pentaerythritol, sorbitol or any other tri or polyfunctional crosslinker.

The invention also provides for a method in which an additive can be present in the amount up to 75% of the product. The additive may be a filler.

The invention also provides for a method in which a flame-retardant can be present in the amount of up to 75% of the product. The flame-retardant can be melamine or melamine derivative, guanidine carbonate, expandable graphite, surface treated expandable graphite, mica, vermiculite, alkali metal silicates, borates and boric acids, or any other flame retardant or filler.

This invention also provides for a method in which the silicone foam is made up of up to 99.9% polyurethane foam.

This invention also provides a method that can be performed by a one-shot foaming method and a prepolymer method. The prepolymer can be made by reacting a crosslinker with polyisocyanate to form a prepolymer. A component can be formed by mixing a silicone oligomer having a plurality of functional end groups with active hydrogens with water. In order to produce silicone foam the prepolymer is reacted with the component under foam forming conditions. Alternatively the prepolymer can be formed by reacting silicone oligomer having a plurality of functional end groups with active hydrogens with polyisocyanate and crosslinker to form a prepolymer. A component is formed by mixing silicone oligomer having a plurality of functional end groups with active hydrogens with water. In order to produce silicone foam the prepolymer is reacted with the component under foam forming conditions.

The invention also provides for a method that is performed under variable barometric pressure conditions ranging from 1.0 psi absolute (7 kPa) to 27.5 psi absolute (190 kPa).

The invention also provides for a method that is used to make molded silicone foam.

This invention also provides a silicone foam that can be made from the method described above and can have a density between 0.5 pcf to 25 pcf (8 to 400 kg/m$^3$).

The current invention describes the replacement of conventional polyether polyol with hydroxy/amine alkyl terminated polydimethylsiloxanes in order to produce novel, high resilience, fire-retardant, flexible silicone foams.

The current invention utilizes a hydroxyalkyl or aminoalkyl terminated polydimethylsiloxane oligomer to react with an isocyanate as used in polyurethane flexible foams in the presence of polyurethane foam forming agents to produce high resilience novel foam material with both siloxane (—Si—O—Si—) and urethane (—NH—C(=O)—O—) linkages. Similar to flexible polyurethane foams, carbon dioxide gas is liberated by the reaction of isocyanate with water, to act as the blowing agent. This produces a foam material with a siloxane segment in the backbone of the polymer and as a result shows excellent resiliencies when compared to conventional polyether/polyester based polyurethane foams.

This new flexible silicone foam is an ideal candidate material for various flexible foam applications that require, high resilience and fire retardant properties such as residential upholstered furniture industry, seat cushioning industry and bedding.

DETAILED DESCRIPTION OF THE INVENTION

Definitions

"Silicone foam" means flexible cellular material prepared by reacting (1) a silicone oligomer having a plurality of functional end groups with active hydrogen atoms (2) a polyisocyanate and optionally (3) a crosslinker under foam forming conditions.

"Polyisocyanate" means an isocyanate having more than one reactive isocyanate (—N=C=O) groups. It is one of the two major ingredients in the chemical process by which conventional polyurethane foam is made. Examples are toluene diisocyanate (TDI), 4,4'-diphenylmethane diisocyanate (MDI), Dicyclohexylmethane-4,4'-diisocyanate (H$_{12}$MDI) Hexamethylene diisocyanate (HDI).

"Foam forming conditions" means under circumstances that make it possible to make foam. The use of blowing agents, surfactants, and catalysts would be an example of under foam forming conditions.

"Average total functionality" means adding up the total functionality and dividing by the number of reactants. For example if you have a silicone oligomer having a plurality of functional groups with active hydrogens having a functionality of 2, a polyisocyanate with a functionality of 2 and, a crosslinker with a functionality of 3 the average total functionality is 2+2+3/3=2.33. Another example would be if you have a silicone oligomer having a plurality of functional end groups with active hydrogens having a functionality of 3 and a polyisocyanate having a functionality of 2 the average total functionality would be 2+3/2=2.5.

"Up to 75% of the product" means 0-75% of the total product is made up of the particular component referred to.

"Prepolymer" means an isocyanate in which a portion (large or small) of the isocyanate groups has been reacted with a polyol to make a NCO-terminated prepolymer. "Full" prepolymers are generally considered to have an NCO content of 3-10 percent. "Quasi" prepolymers have NCO content in the 10-20% range. May also apply to OH-terminated prepolymers where a portion of the polyol OH groups is reacted with an isocyanate. For the purposes of our invention the definition of prepolymer also includes an iscoyanate in which a portion (large or small) of the isocyanate groups has been reacted with an amine terminated oligomer to a make a NCO-terminated prepolymer.

"Silicone or siloxane" means a structure having alternating silicon and oxygen atoms.

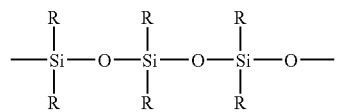

This molecular structure of silicone is the reason for its extreme durability in the face of high and low temperatures, ultraviolet radiation, and exposure to a wide variety of chemicals. Attached to the silicon atoms are organic groups, represented by R such as:

| | |
|---|---|
| Methyl | R = CH$_3$ |
| Ethyl | R = C$_2$H$_5$ |
| Phenyl | R = C$_6$H$_5$ |

"Polydimethylsiloxane" means an oligomer comprising alternating silicon and oxygen atoms in the backbone with two methyl groups directly attached to the silicon (Si) atoms. Polydimethylsiloxane as used herein is a species of silicone oligomer having a plurality of functional hydroxy alkyl or amino alkyl end groups with active hydrogen atoms.

"Silicone oligomer having a plurality of functional end groups with active hydrogens" means a silicone with 2 or more functional end groups having reactive hydrogen atoms. The number of repeating units of the oligomer can range from 10 to 500. Typically the oligomer will be a hydroxy propyl silicone diol having 40-80 mer units. When it is a silicone diol the generic structural formula is the following:

HO—R'—SiR$_2$—O—[SiR$_2$O]$_n$—SiR$_2$—R'—OH

R' Linear or branch alkyl component preferably 1-12, more preferably 1-8, and most preferably 1-4 carbon atoms

R=alkyl groups having 1-6 carbons independently selected.

n=10-500

When the oligomer is at least tri functional silicone polyol it will have the following structure.

[Y]((SiR$_2$O)$_n$—SiR$_2$—R'—OH))$_z$

Y=functional initiator having a functionality from 3-8.

R'=Linear or branch alkyl component preferably 1-12, more preferably 1-8, and most preferably 1-4 carbon atoms

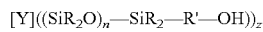

R=can include alkyl groups having 1-6 carbons independently selected.

n=10-500 z=The number of branches. If it is tri functional, z would be 3.

The active hydrogens may be in terminal hydroxyalkyl groups as well as aminoalkyl groups. Terminal hydroxyalkyl groups can be hydroxyethyl, hydroxypropyl, hydroxybutyl, or any other hydroxyalkyl group. Terminal aminoalkyl groups can be aminopropyl, aminobutyl, isobutylmethylamine or any other primary or secondary aminoalkyl group. Tegomer® H—Si-2311, H—Si-2111, H—Si-2711 (Chemical family: Hydroxyalkyl polydimethylsiloxane, Manufactured by Goldschmidt Chemical Corporation) or any other siloxanes having a plurality of functional end groups with active hydrogens will be useful.

"Crosslinker" means any reactive molecule with a functionality (f) greater than 2. Usually applied to polyols, but appropriate for any reagent of f>2. Also, crosslinkers are capable of making covalent bonds between two or more polymer chains. The compound will have active hydrogen groups such as hydroxyl, amine etc. For our purposes, it must have a functionality of 3 or higher. The range of functionality can be from 3 to 8 with 3 being optimal. Examples are glycerol, triethanolamine, trimethylolpropane, pentaerythritol, and sorbitol.

"Hydroxy alkyl" means a hydroxyl group (—OH) attached to an alkyl component. The term may be used to apply, for example, to —CH$_2$—CH$_2$—CH$_2$—OH, the hydroxypropyl terminal group providing active hydrogens for the polydimethylsiloxane.

"Amino alkyl" means an amine (for our purposes, characterized by having NH, or NH$_2$ end groups in the molecule) group attached to alkyl component.

"Flame-retardant" as a noun means a substance that when added to a synthetic or other material, in our case a silicone foam, will cause the foam to be more difficult to ignite or burn rapidly or lose weight during a fire than without the substance. It is synonymous with fire-retardant. As an adjective, it means the property of retarding combustion. Some examples of flame-retardants (both reactive and unreactive) are halogenated flame-retardants, halogen and phosphorus containing flame-retardants, aluminum trihydrate, melamine and melamine derivatives, guanidine carbonate, ammonium polyphosphates, expandable graphite, surface treated expandable graphite, mica, vermiculite powder, silane-treated aluminum trihydrate, alkali metal silicates such as sodium metasilicate pentahydrates, pentabromodiphenyl oxide, tri (1,3-dichloroisopropyl phosphate), modified tri (1,3-dichloroisopropyl phosphate), chlorinated diphosphate esters, zinc carbonate, zinc borates, boric acid, ammonium pentaborate or a combination thereof. The flame-retardant can be present in an amount from 0% to 75% of the product.

"Functionality from 2.0 to 3.0" means a number of 2 to 3 reactive groups attached to a single molecule. For higher molecular weight polyfunctional materials (egs. Polymeric MDI, polyols), often describes an "average functionality". A fractional functionality, i.e. 2.5, would represent an average functionality for all the molecules in the quantity referred to.

"Poly functional compound" means a molecule with two or more than two reactive groups.

"Glycerol" means HO—CH$_2$—CH(OH)—CH$_2$—OH. It has three reactive hydroxyl groups and is useful as a crosslinking agent.

"One-shot foaming method" means a technique including simultaneous mixing of a silicone oligomer(s) having a plurality of functional end groups with active hydrogen atoms, polyisocyanate(s), crosslinker, catalysts, blowing agent and silicone surfactant (if necessary) to make silicone foam. No prior reaction product between the isocyanate and the polyol is used.

"Prepolymer based method" means a technique to make silicone foams using a pre-reacted product for example, from reacting a portion of silicone oligomer(s) having a plurality of functional end groups with active hydrogens or crosslinker with isocyanate(s). The materials normally contain free terminal isocyanate groups for further reaction with more silicone(s) to produce a final polymer.

"Auxiliary blowing agent" means a secondary, minor blowing agent (usually a physical blowing agent) added to enhance blowing performance or physical properties of the foam. Usually added in addition to water, a chemical blowing agent. These compounds assist foaming process by generating gas beyond that resulting from the isocyanate-water reactions. Examples used in our study include methylene chloride, acetone, methyl formate, tetrahydrofuran, 1,4-dioxane, hydrochlorofluorocarbons, pentane, liquid carbon dioxide, etc.

"Surfactant" means an additive which reduces surface tension, improves wetting characteristics and dispersion stability, or inhibits foam (bubble) formation. Surfactants do these things by concentrating at the surface of a liquid such as at the air/water interface. They do this because they have dual miscibility (solubility) tendencies existing within the same molecule and stay at the, for example, air-water interface. Surfactant is an integral part of the foam manufacturing chemistry. Surfactants used in our invention are typically silicone-based compounds.

"Performed in a mold" means foam made in a batch mold process by molding foam to size and shape in closed molds.

"Foam forming agents" means anything used in the foam making process. The agents can be catalysts, surfactants, blowing agents, and auxiliary blowing agents used to make foam. Water is an example of a blowing agent. Tin and amine catalysts are examples of catalysts that can be used.

Additive" means a material used to modify the properties, processing, or end use of a base polymer including but not limited to fillers and flame-retardants or any combination thereof. The additive can be present in our invention in an amount from up to 75% of the product.

"Intumescent" means on heating, give a swollen multicellular char capable of protecting underlying material from the action of the flame. An example is expandable graphite.

"Under variable barometric pressure conditions" means foams prepared under vacuum or under positive pressure.

The process for preparing silicone foam is described below.

Silicone oligomers having a plurality of functional end groups with active hydrogen atoms were chosen because silicones are known for their lower flammability and higher thermal stability. Silicone oligomers having multifunctional hydroxy alkyl or amino alkyl end groups with active hydrogen atoms with higher functionality (>2) are not currently commercially available in the market and therefore polydimethylsiloxane with a functionality of two was used. As a result, a cross-linker has to be introduced to achieve a functionality of three. Several cross-linkers were studied and glycerin (glycerol) was chosen as the best because of its short hydrocarbon chain, which helps in achieving low flammability. Other crosslinkers studied include diethanolamine, triethanolamine, trimethylolpropane, pentaerythritol and sorbitol. The reaction of glycerol or difunctional silicone oligomer with diisocyanates in the presence of catalysts produces trifunctional species which further interact with difunctional silicone oligomer or glycerol to form final crosslinked product.

The silicone oligomer having a plurality of functional end groups with active hydrogens is reacted with polyisocyanate under foam forming conditions to produce a silicone foam which is resilient. Additives may be added to the foam such as fillers and colorants. They may be present up to 75% of the final product.

The silicone foam can be made even more fire-retardant through the use of flame-retardants. The flame-retardants can be added in during the process of making the foam or can be post-treated after the foam has been made. The flame-retardant can be present in amount of up to 75% of the product. Examples of flame-retardants that can be used are expandable graphite, silane-treated expandable graphite, mica, halogen and phosphorus containing flame-retardants, melamine and melamine derivatives, guanidine carbonate, silicates, borates, silica and metal hydroxides.

Optionally the foam can be made so that up to 99.9% of the foam is conventional polyurethane foam however the 0.1% of hydroxyalkyl terminated polydimethylsiloxane gives added flame-retardant qualities. This is shown in Example 7. In Example 7 acetone and other auxiliary blowing agents (in addition to water) can be used to lower the density of the molded foam. The acetone level used can be in the range of 1 to 20 parts per 100 parts of polyol.

In a one-shot foaming method for making the silicone foam, predetermined amounts of hydroxy alkyl polydimethylsiloxane (e.g. Tegomer® H—Si-2311 with an approximate molecular weight of 3000, Goldschmidt Chemical Corporation), cross-linker, surfactant (when necessary), foaming agent, amine catalyst and tin catalyst are mixed using mechanical stirrer at 2500 rpm until homogeneous mixture is achieved. A predetermined amount of polyisocyanate compound (e.g. TDI, polymeric MDI, $H_{12}$MDI, HDI etc.) was added followed by flame-retardants. In some cases, flame-retardants and fillers were added before the isocyanate. The isocyanate index is maintained in the range from 80 to 150, preferably in the range of 100 to 125. The mixture is stirred for about 15 seconds and poured into a pre-heated cake box with polypropylene lining to prevent heat loss and shrinkage. Cream time and rise time of the foam are recorded. The foam is then cured in an oven at 100° C. for approximately one hour and the foam is demolded to obtain high resilience, open cell, new flexible silicone foam. In some formulations, the foams rose and cured inside a microwave oven with microwave power 1.5 KW (100%). The foams made using less than 100% were better than those made using 100% power. This confirms that less heat is needed in order to obtain good silicone foam.

Good foams were obtained when the cake box was half size and was preheated. Preheating of the box avoided the loss of heat that foam achieves when the reaction starts during mixing. Also, when a smaller box is used for the same volume of mixture, the surface in contact with the air and with the sides of the box is smaller thus reducing the loss of heat.

In the prepolymer method, two strategies were followed. In the first strategy, component A was composed of TDI, part of the hydroxy alkyl terminated polydimethylsiloxane and a tin catalyst. To obtain component A, the desired quantity of hydroxyalkyl polydimethylsiloxane was weighed and tin catalyst was added and mixed. TDI was then added and mixed until a homogeneous mixture was obtained. Component B contains rest of the hydroxy alkyl terminated polydimethylsiloxane, water, crosslinker (glycerin), amine catalyst and flame-retardants. To obtain silicone foams, component A was poured into component B and mixed. In the second strategy, glycerin was not used in component B and is added to component A instead. The procedure to obtain component A was the same as above. In some formulations, amine catalyst was not used in component B and added to component A instead.

Within the second strategy, a new variation was also studied. A silicone oligomer having a plurality of functional end groups with active hydrogens was added and mixed to a stoichiometric mixture of glycerin and TDI with tin catalyst. Then, surfactant (if necessary), water, and amine catalyst were added and mixed again. The component B thus obtained was then mixed with the remaining amount of TDI.

This invention will now be further explained with reference to the following examples.

EXAMPLE 1

In this example, a two part, foamable silicone formulation is prepared. The formulation consisted of the following ingredients in the following parts by weight.

| Ingredients | Parts by weight | Batch Weight (g) |
|---|---|---|
| a) Hydroxy alkyl terminated Polydimethylsiloxane | 100 | 1382.9 |
| b) Glycerol | 1.24 | 17.10 |
| Water | 2.43 | 33.60 |
| c) Dabco ® 33LV | 0.32 | 4.50 |
| d) Dabco ® T-12 | 0.20 | 2.80 |
| e) TDI | 37.4 | 517.13 |
| Isocyanate Index | 110 | |
| Mix time | | 15 sec |
| Cream time | | 40 sec |
| Rise time | | 120 sec | a) Tegomer ® H-Si-2311: hydroxy alkyl terminated polydimethylsiloxane with approximate molecular weight of 3000. (Goldschmidt Chemical Corporation). Other silicone oligomers having a plurality of functional end groups with active hydrogens may include Tegomer ® H-Si-2111, with approximate molecular weight of 1500, Tegomer ® H-Si-2711 with approximately 70 repeating units of dimethylsiloxanes (approximate molecular weight of 5200) and Dow Corning ® silicone fluid 1248.
b) A cross-linker.
c) A 33% solution of triethylene diamine in dipropylene glycol.
d) Strong gel catalyst: dibutyltin dilaurate.
e) 80%/20% 2,4-/2,6-toluene diisocyanate.

In this example, a mixture of 1382.9 grams of Tegomer® H—Si 2311, 17.10 grams of glycerol, 33.60 grams of water, 4.50 grams of Dabco® 33LV and 2.80 grams of Dabco® T-12 tin catalyst were weighed into a plastic cup and subjected to a mixing, until homogenized. 517.13 grams of TDI was weighed into another cup and transferred to the mixing cup immediately. The ingredients were mixed for about 15 to 20 seconds using high-speed mixer with 2100 rpm. The mixture was then poured into a pre-heated box with polypropylene lining. Once the foam stops rising, the box was cured in an oven at 100° C. for approximately one hour. Specimens were cured for several days followed by conditioning at 23±2° C. and in an atmosphere of 50±5% relative humidity gave following results.

| Property - Test Method | English Units | SI Units |
|---|---|---|
| Density - ASTM D3574, Test A | 2.25 pcf | 36.04 kg/m³ |
| IFD at 4" (25% Deflection) - ASTM D3574, Test B₁ | 40.67 lbs | 180.9 N |
| IFD at 4" (65% Deflection) - ASTM D3574, Test B₁ | 86.64 lbs | 385.4 N |
| Support Factor | 2.13 | 2.13 |
| Resilience - ASTM D3574, Test H | 65% | 65% |
| Tensile Strength - ASTM D3574, Test E | 11.5 psi | 79.3 kPa |
| Elongation - ASTM D3574, Test E | 63.3% | 63.3% |
| Compression Set (50% Deflection) - ASTM D3574, Test D | 6.10% | 6.10% |
| Pounding test - ASTM D3574, Test I₃ | | |
| % Height loss | 3.14% | 3.14% |
| % IFD loss at 40% (measured 1 hr after test) | 28.0% | 28.0% |
| Smoke Generation - ASTM E662 | | |
| Flaming mode: $Ds_{90s}$-$Ds_{240s}$-$D_{max\ (corr)}$ | 113-122-104 | |
| Non-flaming mode: $Ds_{90s}$-$Ds_{240s}$-$D_{max\ (corr)}$ | 92-170-238 | |

EXAMPLE 2

This example illustrates the preparation of novel silicone foam by prepolymer method. Component B consisted of Tegomer® H—Si 2311, water and amine catalyst. Glycerol and tin catalyst were added to TDI to obtain component A. Isocyanate index for this example was maintained at 103. Component A was added to Component B and mixed for 15 seconds. The mixture was poured into a pre-heated box with polypropylene lining. The foam was cured at 100° C. for one and half hours to obtain flexible opened cell silicone foam. The formulation details are shown below.

| Ingredients | Parts by weight (pbw) |
|---|---|
| COMPONENT B | |
| Tegomer ® H-Si 2311 | 100 |
| DABCO ® 33LV | 0.28 |
| Water | 2.02 |
| COMPONENT A | |
| Glycerol | 1.21 |
| Dabco ® T-12 | 0.18 |
| TDI | 31.00 |
| Cream time | 40 sec |
| Rise time | 135 sec |
| Temp. max | 34-36° C. |

Some physical properties of the resultant silicone foam are shown below.

Density: 4.45 pcf (71.2 kg/m³)

Resilience: 67%

EXAMPLE 3

In this example, a flame-retardant silicone foam is prepared by introducing modified tri(1,3-dichloroisopropyl)phosphate (Fyrol® 38, Akzo Nobel-Chemicals, Inc.) as a flame retardant. The formulation details are shown below.

| Ingredients | Parts by weight |
|---|---|
| Tegomer ® H-Si 2311 | 100 |
| Glycerin | 1.24 |
| Water | 2.53 |
| Dabco ® 33LV | 0.32 |
| Dabco ® T-12 | 0.24 |
| a) Fyrol ® FR-2 or b) Fyrol ® 38 | 15.20 |
| TDI | 35.58 | a) Tri(1,3-dichloroisopropyl) phosphate, Akzo Nobel Chemicals Inc.
b) Modified tri(1,3-dichloroisopropyl) phosphate, Akzo Nobel Chemicals Inc The following test for flame resistance was carried out on the resultant silicone foam. California Technical Bulletin #117: Pass

EXAMPLE 4

The procedure of Example 3 was repeated using a combination of Fyrol® FR2 or Fyrol® 38 with, zinc borate produced and sold by U.S. Borax Corporation. The following Table summarizes the formulation details.

| Ingredients | Parts by weight | Batch wt. | Parts by weight | Batch wt |
|---|---|---|---|---|
| Tegomer ® H-Si 2311 | 100 | 740.85 | 100 | 740.85 |
| Glycerol | 1.24 | 9.15 | 1.24 | 9.15 |
| Water | 2.53 | 18.75 | 2.53 | 18.75 |
| Dabco ® 33LV | 0.32 | 2.4 | 0.32 | 2.4 |
| Dabco ® T-12 | 0.24 | 1.8 | 0.24 | 1.8 |
| Zinc Borate (Firebrake ® ZB) | 7.0 | 52.5 | 7.0 | 52.5 |
| Fyrol ® FR-2 | 15.0 | 112.5 | — | — |
| Fyrol ® 38 | — | — | 15.0 | 112.5 |
| TDI | 36.02 | 266.85 | 36.02 | 266.85 |

The total batch weight of the above formulations which containing a combination of Fyrol® FR-2 or Fyrol® 38 and zinc borate was 1205 grams. As discussed in previous examples, insulated boxes were preheated at 100° C. before pouring into the box. Other processing parameters include: Mixing temperature 35° C., Mixing time 18 sec, Cream time 35 sec, Rise time 140 sec. At the end of the rise cycle, the foam was cured at 100° C. for one hour.

The following physical and fire resistant properties were obtained for the resultant silicone foam.

Density: 3.86-6.40 pcf (61.83-102.5 kg/m$^3$)
Resilience: 55%-65%
Compression set (50% Deflection)-ASTM D3574, Test D: 8.0-15.0%
Tensile strength: 8.10-17.37 psi (55.8-119.8 kPa)
Elongation: 70-80%

The best foam obtained was with the combination of Fyrol® 38 and zinc borate, which has low density and high resilience with no burning flame and little smoking or dripping.

EXAMPLE 5

This example illustrates a molded silicone foam prepared using water as a blowing agent and methylene chloride as auxiliary blowing agent together with polymeric MDI as an isocyanate.

| Ingredients | Parts by weight |
|---|---|
| Tegomer ® H-Si 2311 | 100 |
| Glycerol | 1.25 |
| Water | 1.00 |
| Methylene Chloride | 5.00 |
| Dabco ® 33LV | 0.30 |
| Dabco ® T-12 | 0.20 |
| a) Bayfit ® 573A | 29.83 | a) Polymeric MDI with NCO content of 32.3% (Bayer Corporation)

The resultant silicone foam gave following test results.
Density: 5.94 pcf (95.15 kg/m$^3$)
Smoke under non-flaming mode: Ds (90s)-Ds(240 sec)-Dmax (Corr): 40-89-192.
FAA 25.853 (a), Appendix F, Part I, (a), (ii), 12-sec vertical Bunsen burner test: Pass (Flame time: 0 sec, Drip Flame time: 0 sec, Burn length: 4 inch). Material drips, but dripping did not burn.

EXAMPLE 6

In this example, 30 parts by weight of expandable graphite was incorporated into the new silicone foam together with 15 parts by weight of Fyrol® FR2. The free rise foam settled a little at a point in time just after the peak rise. The following Table summarizes the formulation details.

| Ingredients | Parts by weight |
|---|---|
| Tegomer ® H-Si 2311 | 100 |
| Glycerol | 1.24 |
| Water | 2.43 |
| Dabco ® 33LV | 0.32 |
| Dabco ® T-12 | 0.24 |
| a) Expandable Graphite | 30 |
| Fyrol ® FR2 | 15 |
| TDI | 36.08 |
| Index = 110 | | a) GRAFGuard ® 160-80-N received from Ucar Carbon Company.

The properties of the resultant foam are as follows.

The density of the expandable graphite modified novel flexible silicone foam material was 4.0 pcf (64 kg/m$^3$). The 25% and 65% indentation force deflection values of the foam at 2 inch thickness were 15.58 lbs and 54.12 lbs respectively. When a 6"×6"×2.5" inch foam specimen was exposed to a Meker type, grid top high-temperature burner flame for 2 minutes followed by another 5 minutes under smoldering, the new silicone foam specimen self extinguished when the burner was turned off after 2 minutes and showed only 3.7% weight loss during the total 7 minute test period indicating that this new foam is an ideal candidate material to meet Federal Aviation Administration oil burner requirement for aircraft seat cushion applications. This material passed both FAA 25.853(a), Appendix F, Part I, 12 sec and 60 sec vertical burn test standards. When subjected to a 12 sec test, foam gave 0 sec flame time, 0 sec drip flame time and 5.08" burn length. The results obtained for 60 second burn test were; 0 second flame time, 0 second drip flame time and 5.7 inch burn length. The weight loss obtained from the FAR 25.853 (c), Appendix F, Part II, oil burner test was 8.0%. This material also passed California TB #117 and showed 60% resilience and 70% elongation.

EXAMPLE 7

The following fire-retardant molded foam formulations summarize the effect of 0-1 pbw (0-0.2%) of silicone oligomer having a plurality of functional end groups with active hydrogens on physical and fire-retardant properties of modified molded polyurethane foams. In this example acetone can be added as an auxiliary blowing agent in the amount of 1 to 20 parts per 100 parts of polyol.

| | pbw | pbw | pbw |
|---|---|---|---|
| a) Multranol ® 3901 | 100 | 100 | 100 |
| Tegomer ® H-Si-2311 | 0 | 0.5 | 1.0 |
| Aluminum Trihydrate | 60 | 60 | 60 |
| Ammonium polyphosphate | 15 | 15 | 15 |
| Antimony Trioxide | 7 | 7 | 7 |
| Zinc Borate | 50 | 50 | 50 |
| b) Guanidine Carbonate | 5 | 5 | 5 |
| c) Antiblaze ® 100 | 15 | 15 | 15 |
| d) Fyrol ® PBR | 20 | 20 | 20 |
| Water | 3.20 | 3.20 | 3.20 |
| e) DEOA LF | 1.00 | 1.00 | 1.00 |
| f) DABCO ® DC 5169 | 1.20 | 1.20 | 1.20 |

-continued

|  | pbw | pbw | pbw |
|---|---|---|---|
| DABCO ® 33LV | 0.50 | 0.50 | 0.50 |
| DABCO ® T-12 | 0.57 | 0.57 | 0.57 |
| Bayfit ® 573A | 63.85 | 63.90 | 63.94 |
| Physical characteristics | | | |
| Density (lbs/cu.ft) | 4.20 | 4.20 | 4.20 |
| IFD at 4" thickness (25% deflection) (lbs) | 43.06 | 63.51 | 64.87 |
| Flame performance characteristics | | | |
| FAA 25.853 (a) 12 sec test | Fail | Pass | Pass |
| Weight loss (%) from 6" x 6"2.5" foam block experiment | 18.0% | 12.1% | 11.1% | a) A polyether polyol, available from Bayer Corporation.
b) Available from Avatar Corporation
c) Chloronated diphosphonate ester available from Rodhia Inc.
d) Brominated flame-retardant based on pentabromodiphenyl ether, available from Akzo Nobels Chemicals Inc.
e) an 85% solution of diethanolamine in water.
f) A surfactant available from Air Products and Chemicals, Inc.

We claim:

1. A method for producing a silicone foam comprising reacting a polyisocyanate, a silicone oligomer having a plurality of functional end groups with active hydrogens, and, optionally, a crosslinker, under foam forming conditions wherein the average total functionality of said polyisocyanate, said silicone oligomer having a plurality of functional end groups with active hydrogens, and said crosslinker is greater than 2 to produce silicone foam, wherein the silicone oligomer having a plurality of functional end groups with active hydrogens is at least 10% percent of the reaction mixture.

2. A method for producing a silicone foam comprising reacting a polyisocyanate, a silicone oligomer having a plurality of functional end groups with active hydrogens, and, optionally, a crosslinker, under foam forming conditions wherein the average total functionality of said polyisocyanate, said silicone oligomer having a plurality of functional end groups with active hydrogens, and said crosslinker is greater than 2 to produce silicone foam that has greater than 10% of silicone in a polymer backbone of the silicone foam.

* * * * *

UNITED STATES PATENT AND TRADEMARK OFFICE
CERTIFICATE OF CORRECTION

PATENT NO. : 7,393,879 B1
APPLICATION NO. : 10/164480
DATED : July 1, 2008
INVENTOR(S) : Jiri E. Kresta et al.

It is certified that error appears in the above-identified patent and that said Letters Patent is hereby corrected as shown below:

Column 4, Line 56 cancel "to a make a NCO" and insert --to make a NCO--

Column 7, Line 23 cancel "Additive" " and insert --"Additive"--

Column 10, Line 55 cancel "Chemicals Inc" and insert --Chemicals Inc.--

Column 13, Line 14 cancel "6" x 6"2.5" foam" and insert --6" x 6" x 2.5" foam--

Signed and Sealed this

Twenty-eighth Day of October, 2008

JON W. DUDAS
*Director of the United States Patent and Trademark Office*